United States Patent
Müller

(10) Patent No.: US 10,609,260 B2
(45) Date of Patent: Mar. 31, 2020

(54) ASSISTANCE SYSTEM FOR A MOTOR VEHICLE

(71) Applicant: Conti Temic microelectronic GmbH, Nürnberg (DE)

(72) Inventor: Gerhard Müller, Bad Waldsee (DE)

(73) Assignee: Conti Temic microelectronic GmbH, Nuremberg (DE)

(*) Notice: Subject to any disclaimer, the term of this patent is extended or adjusted under 35 U.S.C. 154(b) by 177 days.

(21) Appl. No.: 15/355,955

(22) Filed: Nov. 18, 2016

(65) Prior Publication Data

US 2017/0070652 A1 Mar. 9, 2017

Related U.S. Application Data

(63) Continuation of application No. PCT/DE2015/200213, filed on Mar. 31, 2015.

(30) Foreign Application Priority Data

May 21, 2014 (DE) .................. 10 2014 209 611

(51) Int. Cl.
*H04N 5/225* (2006.01)
*G03B 17/55* (2006.01)
*B60R 11/04* (2006.01)

(52) U.S. Cl.
CPC ........... *H04N 5/2252* (2013.01); *B60R 11/04* (2013.01); *G03B 17/55* (2013.01); *B60R 2300/80* (2013.01)

(58) Field of Classification Search
CPC ... H04N 5/2252; B60R 11/04; B60R 2300/80; B60R 1/10; B60R 1/00; G03B 17/55
See application file for complete search history.

(56) References Cited

U.S. PATENT DOCUMENTS

| 7,907,411 B2 * | 3/2011 | Whittum ............ H05K 7/20372 165/185 |
| 2005/0104995 A1 * | 5/2005 | Spryshak ............... G02B 7/026 348/360 |
| 2017/0354465 A1 * | 12/2017 | Rink ..................... A61B 18/22 |

FOREIGN PATENT DOCUMENTS

| CN | 2399766 Y | 10/2000 | |
| CN | 203358477 U | 12/2013 | |
| DE | 10319176 A1 | 11/2004 | |
| DE | 10329900 A1 | 2/2005 | |
| DE | 102010008215 A1 * | 9/2010 | ............ B60R 11/04 |
| DE | 102010008215 A1 | 9/2010 | |
| DE | 102012013193 A1 | 1/2014 | |
| DE | 102012213813 A1 | 2/2014 | |
| EP | 1473193 A1 | 11/2004 | |
| JP | 2001088611 A | 4/2001 | |
| WO | WO2009135539 A1 | 11/2009 | |

(Continued)

OTHER PUBLICATIONS

German Search Report dated Dec. 3, 2015 for corresponding German Patent Application No. 10 2014 209 611.1.

(Continued)

*Primary Examiner* — Joseph W Becker

(57) ABSTRACT

An assistance system of a motor vehicle, with a camera comprises a camera housing having a first cooling body with first cooling fins, a cap covering the camera housing, wherein the cap has a second cooling body with second cooling fins, and wherein the second cooling fins are arranged at least partially between the first cooling fins.

19 Claims, 2 Drawing Sheets

(56) References Cited

FOREIGN PATENT DOCUMENTS

WO 2013019795 A1 2/2013

OTHER PUBLICATIONS

International Search Report and Written Opinion dated Jun. 30, 2015 from corresponding International Patent Application No. PCT/EP2015/200213.
China Office Action dated Jul. 16, 2018 for corresponding Chinese Patent Application No. 201580025686.2.
Chinese Office Action dated Jan. 31, 2019 for corresponding Chinese Patent Application No. 201580025686.2.

* cited by examiner

ASSISTANCE SYSTEM FOR A MOTOR VEHICLE

CROSS REFERENCE TO RELATED APPLICATIONS

This U.S. patent application claims the benefit of PCT patent application No. PCT/DE2015/200213, filed Mar. 31, 2015, which claims the benefit of German patent application No. 10 2014 209 611.1, filed May 21, 2014, both of which are hereby incorporated by reference.

TECHNICAL FIELD

The invention relates to an assistance system for a motor vehicle, with a camera comprising a camera housing.

BACKGROUND

Motor vehicles comprise a plurality of assistance systems, such as rain sensors, lane assistants or fatigue warning assistants. Every such assistance system comprises a camera by means of which the front windscreen, the road and/or the driver are captured. The image captured is checked for deviations from a certain set state, and if such a state is present, an actor is actuated such as a windscreen wiper motor, a motor for influencing the steering angle and/or an acoustic or visual sensing element.

The camera usually comprises electronics arranged within a camera housing, by means of which the captured images are processed. Due to increasing demands on the processing of the captured images, the computing capacity required for this purpose is growing, leading to an increase in thermal loss. If the camera is already exposed to solar radiation, the thermal load on the camera increases. If the camera is located in an interior area of the motor vehicle, the camera housing is usually covered by a cap for reasons of visual appearance. As a result, it is impossible or at least more difficult to discharge the heat generated within the camera housing in the interior area, which is usually air conditioned. In order to be able to guarantee reliable operation, the components of the camera which are individually used must therefore have a high maximum operating temperature, which leads to increased production costs. Otherwise, it is necessary, in order to avoid damage to the camera or faulty functioning, to switch off the camera entirely or partially, and in so doing limit the amount of heat which builds up.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The object of the invention is to provide a particularly suitable assistance system for a motor vehicle, which is in particular also safe to operate at comparatively high temperatures, and which can advantageously be produced at a low cost.

The assistance system is for example a lane assistant, a parking aid, a fatigue warning assistant, and emergency brake assistant or a traffic sign recognition assistance system. The assistance system comprises a camera with a camera housing, wherein the camera housing is for example affixed to a front windscreen of the motor vehicle or is at least located in the area of the front windscreen. The camera is covered by a cap, preferably one which is designed in a shell shape, which is for example coordinated with the interior design of the motor vehicle. A gap is formed in particular between the camera and the cap, which is filled with surrounding air. In other words, the camera is at a distance from the cap. The cap is used to cover any electrical lines for supplying power or for data transfer to or from the camera. In other words, such lines are located between the camera housing and the cap.

For example, the cap is affixed by means of a clip connection to a corresponding holder, on which the camera housing is attached in a suitable manner, for example by means of screws or similar. In particular, the cap has a comparatively low weight, at least, it weighs less than the camera. As a result, it is sufficient to affix it using clips, while at the same time, the comparatively heavy camera is attached by means of a comparatively robust affixing method to further components of the motor vehicle, such as the windscreen or a camera holder attached to said windscreen. The cap essentially has a merely visual function. In other words, the cap serves only to conceal the camera housing. At the same time, by means of the camera housing, further components of the camera which are arranged within the camera housing are protected against damage or contamination. These components serve in particular to capture images and process them electronically. Preferably, the camera housing is closed with the exception of any light entrance openings.

The camera housing comprises a first cooling body with first cooling fins. Each of the first cooling fins comprises a right-angled profile, for example, which is connected by means of a plate, so that the cooling body essentially has a comb-shaped profile. Here, the cooling fins preferably point outwards, so that they at least partially form an outer boundary of the camera housing. The first cooling body is advantageously produced from a thermally conductive material, in particular a metal or a thermally conductive plastic. Preferably, the first cooling body consists of aluminum or an aluminum alloy, which leads to a reduction in the weight of the camera housing. Advantageously, the aluminum is coated with lacquer and/or anodized, which has an increased thermal emission coefficient (degree of emission) compared to pure aluminum. For example, the thermal emission coefficient of the first cooling body is between 0.7 and 0.95, in particular higher than 0.8 and suitably equal to 0.9. Due to the cooling fins, the surface of the first cooling body is enlarged, so that a thermal exchange and thus a thermal discharge from the camera acting as a heat source is improved.

The cap comprises a second cooling body with second cooling fins. Advantageously, the profile of each of the second cooling fins is rectangular, wherein one of the free ends is attached to a plate on the second cooling body, so that the second cooling body has an essentially comb-like profile. Preferably, the second cooling body consists of a thermally conductive material, in particular a metal and suitably aluminum, which leads to a comparatively low weight of the cap. Advantageously, the aluminum is coated with lacquer and/or anodized, which has an increased thermal absorption coefficient compared to pure aluminum. Alternatively, the second cooling body consists of a plastic which suitably has a comparatively high absorption coefficient. For example, the thermal absorption coefficient of the second cooling body is between 0.7 and 0.95, in particular higher than 0.8 and suitably equal to 0.9. The second cooling fins are arranged at least partially between the first cooling fins. In other words, the first cooling fins and the second cooling fins engage at least partially with each other. In particular, each of the first cooling fins is arranged adjacent to two second cooling fins respectively, and each second cooling fin is arranged adjacent to two first cooling fins. Here, at least one of the two second cooling fins arranged on the outermost side is adjacent only to one of the first cooling fins. In other words, the side boundary of the group of the two cooling bodies is formed by one of the second cooling fins, or two boundaries of the group are formed by one of the second cooling fins respectively. Alternatively or in combination with this, at least one side boundary is formed by means of one of the first cooling fins. Preferably, the two cooling bodies face towards each other. In other words, the free ends of the second cooling fins point towards the first cooling fins, and the free ends of the first cooling fins point to the second cooling body.

Due to the use of two cooling bodies with their respective cooling fins, the surface used for the heat exchange by means of heat radiation is enlarged between the camera housing and the cap. As a result, during operation, a comparatively large amount of heat is transferred from the camera housing onto the cap, from where the heat can be comparatively easily discharged into the atmosphere. In particular, the cap is cooled using convection during operation, for example by means of an air conditioning unit in the motor vehicle. Since the second cooling fins are arranged at least partially between the first cooling fins, the heat of each or at least one large portion of the first cooling fins is radiated onto an adjacent second cooling fin and not onto a further first cooling fin. Thus, the heat introduced in a first cooling fin arranged between the second cooling fins is essentially entirely transferred to the second cooling body and as a result, the camera is comparatively efficiently cooled.

In an advantageous manner, the first cooling fins are arranged parallel to the second cooling fins, wherein the cooling fins run e.g. in the longitudinal direction of the motor vehicle. In particular, the profile of the two cooling bodies is here comb-shaped vertical to the arrangement direction, wherein the comb teeth are formed by means of the respective cooling fins. Here, the comb teeth engage with each other. Due to the parallel nature of the first and the second cooling fins, it is made possible that the second cooling fins can be arranged over a comparatively long length between the first cooling fins. As a result, the thermal exchange surface, which is formed between the first cooling body and the second cooling body, is comparatively large, so that the thermal exchange is improved.

For example, the first cooling body is formed by means of a first housing half of the camera housing. In other words, the camera housing comprises the first housing half, which at least partially forms the first cooling body. As a result, the number of components required for producing the camera housing is reduced, which leads to a reduction in weight and cost. Additionally, a thermal connection between the first cooling body and further elements of the camera housing is not required, so that any possible heat build-up is prevented between precisely these elements of the camera housing. For example, the first housing half is formed as a lid, by means of which the second housing half is closed.

Preferably, a printed circuit board is arranged within the camera housing, by means of which during operation of the assistance system, in particular an electric connection is made in order to process the images captured by means of further elements of the camera. Due to the positioning of the printed circuit board within the camera housing, said board is protected against environmental influences or other damage. The printed circuit board is advantageously in thermal contact with the first housing half. As a result, when the printed circuit board heats up, the heat is transferred by means of the second housing half onto the second cooling body, so that even with a comparatively high thermal loss of individual components of the printed circuit board, these are comparatively efficiently cooled. In particular, the printed circuit board lies on the first housing half. In other words, the printed circuit board is in direct mechanical contact with the first housing half, wherein in particular, the contact is made via a comparatively large section of the printed circuit board. For example, the area of the direct mechanical contact is between 5% and 10%, 15% or 20% of the area of the printed circuit board. In particular, the printed circuit board lies in an edge area on the first housing half. As a result, the printed circuit board is stabilized.

For example, the camera housing is essentially formed by means of the first and the second housing half. In particular, the printed circuit board is affixed by clamps between the first and the second housing half. In other words, the printed circuit board lies at least partially on the first and the second housing half, and between these, a form-fit connection is realized. Preferably, the area of the system is here an edge area of the printed circuit board. Due to such a connection, no further affixing means are required, which leads to cost savings. Additionally, the printed circuit board is comparatively securely held, which is why the assistance system is comparatively robust. For production purposes, the printed circuit board is here advantageously positioned onto a section of one of the housing halves, in particular laid on, and in a further working step, the remaining housing half is arranged accordingly. In a next working step, the two housing halves are connected to each other and the printed circuit board is then affixed.

Advantageously, the camera comprises an optics module, which in particular comprises a lens and an image sensor, e.g. a CCD or CMOs chip. In particular, the image sensor is covered by means of the lens, or is at least partially enclosed, so that contamination and/or the entrance of scattered light on the image sensor is prevented. Advantageously, the image sensor is here affixed to a further printed circuit board or a carrier. The optics module itself, such as the additional printed circuit board, if this is present, is plugged into a bush or a connector mounted on the printed circuit board, which lies on the first housing half. By means of the bush, an electric and/or signal connection is created between the optics module and the printed circuit board. Due to the plug connection, mounting is here comparatively simple. Alternatively, the signal coupling between the optics module and the printed circuit board is achieved by means of an electric line, such as a ribbon cable.

The lens of the optics module, if present, comprises for example a plastic lens or a combination of at least one plastic and one glass lens. Advantageously, the lens is at least partially positioned within an opening of the camera housing, wherein the opening is in particular inserted into the second housing half, if this is present. Thus, by means of the image sensor positioned within the camera housing, the area around the camera can be captured. For example, a sealing ring or similar is arranged between the lens and the camera housing, so that penetration of foreign particles through the opening is prevented. Alternatively, a gap is formed between the lens and the boundary of the opening, which simplifies the alignment of the lens. Advantageously, the opening is inserted into the second housing half of the camera housing.

In other words, the first housing half is free of the opening. For example, the camera comprises two such optics modules, which are arranged at a distance from each other. As a result, a spatial resolution of the surrounding area captured by the optics module is made possible.

Advantageously, the cap is designed as a single part. In other words, the second cooling body is formed on the remaining elements of the cap. In this manner, the thermal exchange between the second cooling body and the remaining elements of the cap is improved. As a result, it is not necessary to affix the second cooling body to further elements. Furthermore, the number of components is reduced and assembly is simplified.

For example, the first cooling fins lie in contact on the second cooling fins. In other words, the first cooling fins are in direct mechanical contact with the second cooling fins. Preferably, however, the first cooling fins are at a distance from the second cooling fins. Advantageously, the distance is here essentially constant. In this manner, a tolerance offset between the first cooling body and the second cooling body is created, which is why comparatively large production tolerances can be selected. Additionally, a relative movement of the camera in relation to the cap is made possible.

Preferably, the area between the first cooling fins and the second cooling fins is free of fluid. In particular, no further fluid is present between the first and the second cooling fins, with the exception of the surrounding air. In this manner, the assistance system can be produced in a comparatively simple way. In particular, the assistance system is free of fans. In other words, the camera is here cooled passively. As a result, no operation of a fan for cooling purposes is required, which is why occupants of the motor vehicle are not exposed to noise. Additionally, costs are reduced and service life is prolonged.

The cap comprises a second cooling body with two cooling fins, which is provided and equipped to cover a camera housing with a first cooling body. Here, the second cooling fins are arranged at least partially between first cooling fins of the first cooling body.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

An exemplary embodiment of the invention will now be described below with reference to a drawing, in which.

DETAILED DESCRIPTION

Figure 1:
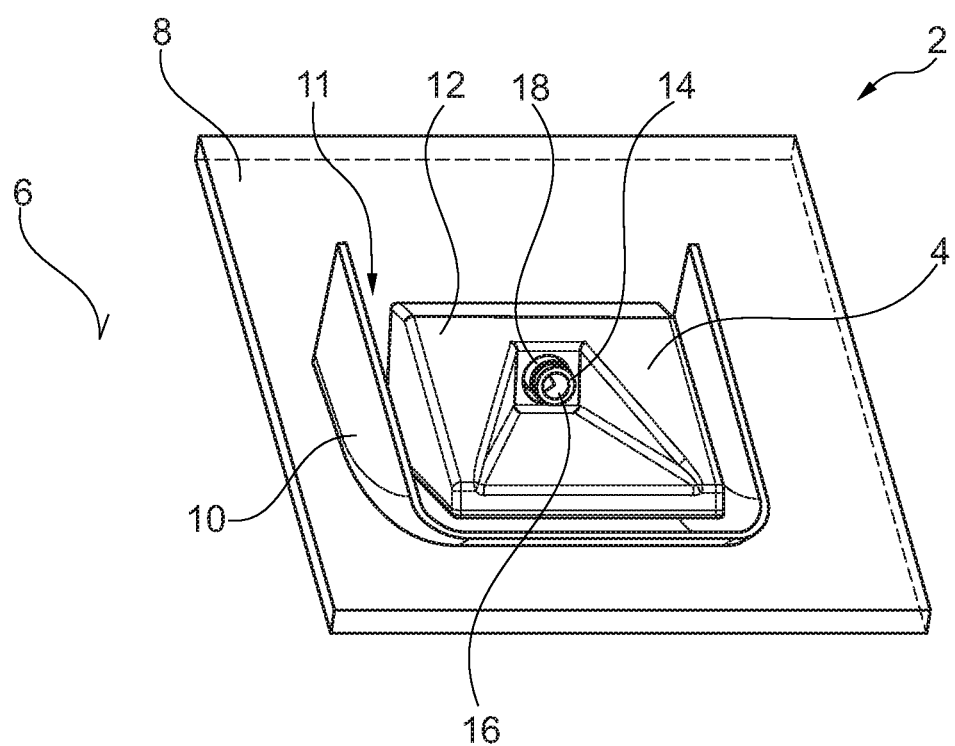
FIG. 1 shows a perspective view of an assistance system of a motor vehicle from the front.

Parts which correspond to each other are assigned the same reference numerals in all figures.

FIG. 1 shows a perspective view of an assistance system 2 of a motor vehicle from the front. The assistance system 2 here serves to detect traffic signs. For this purpose, the assistance system 2 comprises a display unit not shown in greater detail or a connection to a multifunction display in a cockpit of the motor vehicle. The assistance system 2 further comprises a camera 4, which is positioned in an interior area 6 of the motor vehicle behind a front windscreen 8. The camera 4 itself is covered by a cap 10, so that the camera is completely surrounded by the cap 10 and the front windscreen 8, wherein between the cap 10 and the camera 4, a gap 11 is formed. The outer side of the cap 10 is designed to blend in with the interior of the interior area 6. For this purpose, the external color of the cap 10 is the same as the roof lining of the motor vehicle. The camera 4 comprises a camera housing 12 and an optics module 14 with a lens 16, which is partially positioned in an opening 18 of the camera housing 12. Here, the lens 16 points in the direction of the front windscreen 8, so that a capturing of the area in front of the motor vehicle by means of the camera 4 is possible.

Figure 2:
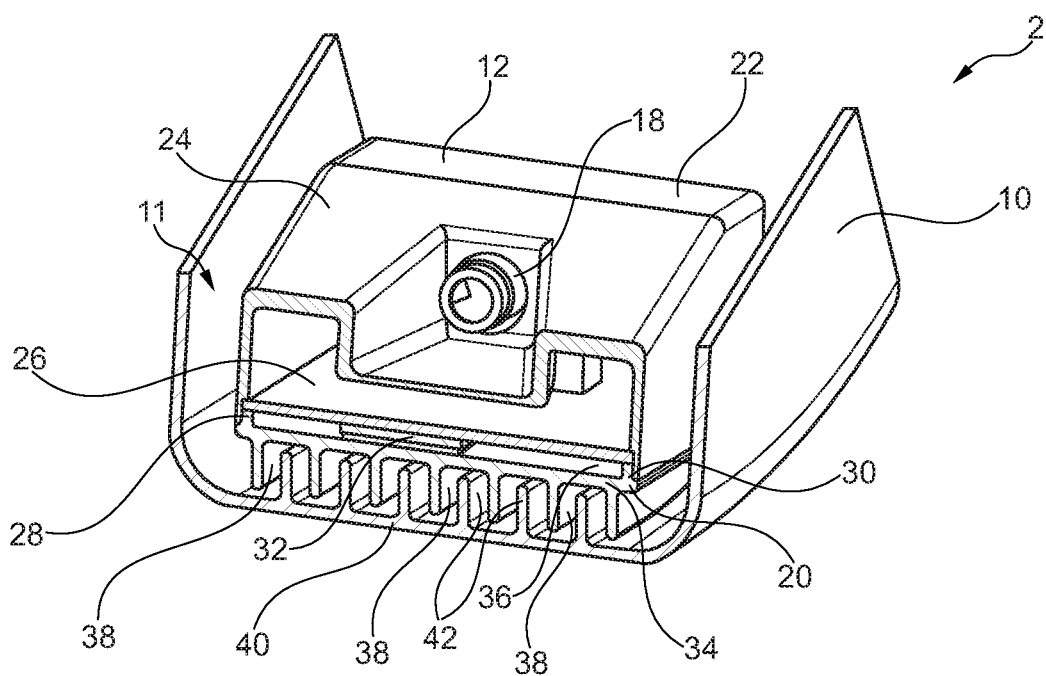
FIG. 2 shows a perspective view of the assistance system in a first profile depiction.

In FIG. 2, the assistance system 2 is shown in a profile view vertical to the longitudinal direction of the motor vehicle. The camera housing 12 comprises a first housing half 20 and a second housing half 22, wherein the opening 18 is inserted into the second housing half 22. Additionally, the second housing half 22 is with at least one contact surface 24 in direct mechanical contact with the front windscreen 8 or a holding plate not shown.

A printed circuit board 26 is affixed by clamping within the camera housing 12 between the first housing half 20 and the second housing half 22. Here, the printed circuit board 26 lies in their edge area on a bridge 28 of the first housing half 20 which points in the direction of the second housing half 22. The printed circuit board 26 and the bridge 28 are gripped by a collar 30 on the second housing half 22, which stabilizes the printed circuit board 26. On the side of the printed circuit board 26 facing away from the second housing half 22, a processor 32 equipped with thermally conductive paste is mounted. As a result, the processor 32 is thermally connected to the first housing half 20, which in this area is designed as a first cooling body 34. The first cooling body 34 comprises a plate 36 which faces towards the second housing half 22, with which the thermally conductive paste is in direct mechanical contact. On the plate 36, first cooling fins 38 are formed which point from the second housing half 22 in the direction of the cap 10 and which run in the longitudinal direction of the motor vehicle. As a result, the profile of the first housing half 20 is essentially comb-shaped.

The single-piece cap 10 comprises on its inner side facing the camera 4 and the front windscreen 8 a second cooling body 40, which has second cooling fins 42 which also run in the longitudinal direction of the motor vehicle. As a result, the second cooling fins 42 run parallel to the first cooling fins 38. The second cooling fins 42 are arranged between the first cooling fins 38. The two cooling bodies 34, 40 thus engage with each other. Here, the outermost of the second cooling fins 42 are enclosed by two of the first cooling fins 38 respectively. The first cooling fins 38 are at a distance from the second cooling fins, which creates a tolerance offset, making the mounting of the assistance system 2 easier.

Figure 3:
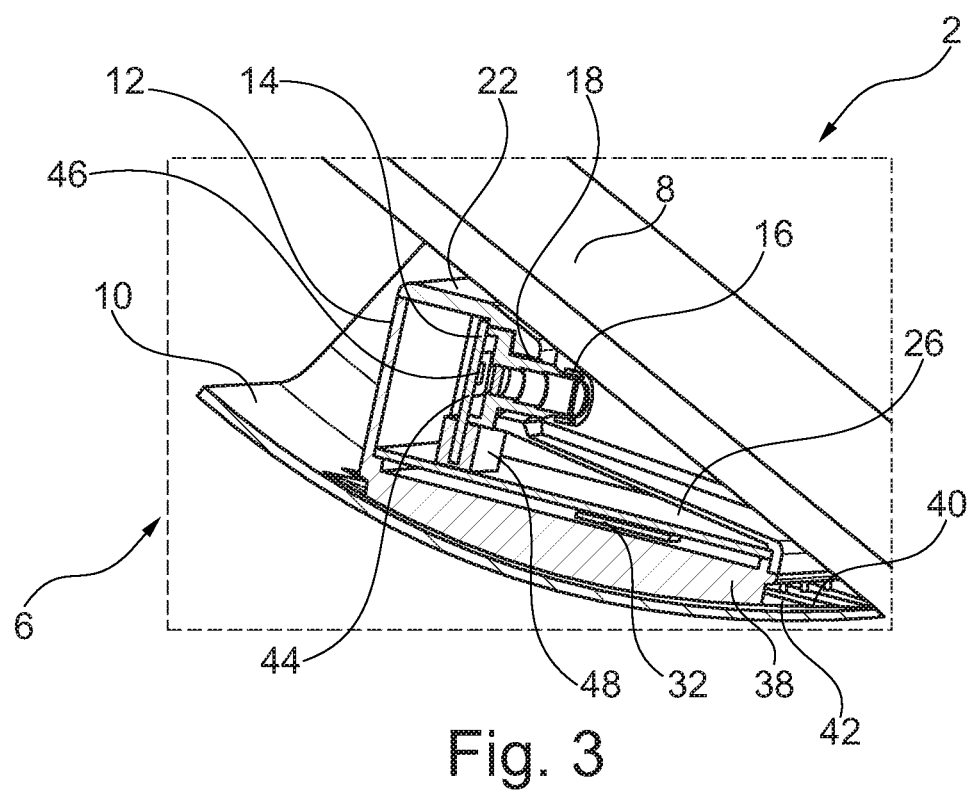
FIG. 3 shows the assistance system in a further perspective depiction.

In FIG. 3, the assistance system 2 is shown in a perspective view along the longitudinal axis of the motor vehicle. The optics module 14 comprises a further printed circuit board 44, on which an image sensor 46 is mounted in the form of a CMOS chip. The image sensor 46 is covered by means of the lens 16 and in this manner is protected against scattered light or foreign particles. In other words, the image sensor 46 is located between the further printed circuit board 44 and the lens 16. By means of the further printed circuit board 44, the electrical voltage produced by the image sensor 46 is read off. The further printed circuit board 44 comprises conductor paths, not shown, which end in contact points, wherein the contact points lie within a bush 48 which is mounted on the printed circuit board 26.

In order to mount the assistance system 2, the image sensor 46 and the lens 16 are first mounted on the further printed circuit board 44. In a step conducted parallel to this in time, the printed circuit board 26 is created with the processor 32 and the bush 48, and the first housing half 20 and the second housing half 22. In a step which follows, the further printed circuit board 46 is inserted into the bush 48 and the lens 16 is inserted into the opening 18 of the second housing half 22. The processor 32 is then coated with thermally conductive paste and the first housing half 20 is connected to the second housing half 22 to create the camera housing 12. As a next step, the camera 4 is affixed to the front windscreen 8 and covered by means of the cap 10, wherein the first cooling fins 38 and the second cooling fins 42 engage with each other.

During operation of the assistance system 2, the surrounding area is displayed on the image sensor 46 by means of the lens and is captured by said sensor, wherein the image sensor 46 is read off by means of the further printed circuit board 44. The signals which are read off are made available to the processor 32 via the bush 48 and are processed by said processor. The heat loss which occurs here is discharged via the first housing half 20 onto the cap 10. From the cap 10, the heat enters the interior area 6, which is maintained at a certain temperature by an air conditioning unit of the motor vehicle. Even when sun is shining through the front windscreen 8 and additional warming of the camera housing 12 occurs as a result, the camera 4 is sufficiently cooled due to the cooling fins 38, 42 which engage with each other, so that operation of the motor vehicle is also possible in a comparatively hot country.

The invention is not limited to the exemplary embodiment described above. To a far greater extent, other variants of the invention can be derived by persons skilled in the art without departing from the object of the invention. In particular, all individual features described in connection with the exemplary embodiment can also be combined in other ways with each other without departing from the object of the invention.

The invention claimed is:

1. An assistance system of a motor vehicle, with a camera comprising:
   a camera housing having a first cooling body with a first plurality of cooling fins extending therefrom, wherein each of the first plurality of cooling fins have a first and a second heat transfer surface;
   a cap covering the camera housing having a second cooling body with a second plurality of cooling fins extending therefrom, wherein each of the second plurality of cooling fins have a first and a second heat transfer surface;
   wherein the second plurality cooling fins are arranged such that each of the second plurality of cooling fins are alternately at least partially between each of the first plurality of cooling fins; and
   wherein the first and second heat transfer surfaces of the first plurality of cooling fins are facing the first and second heat transfer surfaces of the second plurality of cooling fins.

2. The assistance system of claim 1, wherein the first plurality of cooling fins are arranged parallel to the second plurality of cooling fins.

3. The assistance system of claim 1, wherein the first plurality of cooling fins extend in a first direction from a first comb formed on the first cooling body such that the first plurality of cooling fins is integrally formed as part of the first cooling body.

4. The assistance system of claim 3, wherein the second plurality of cooling fins extend in a second direction from a second comb formed on the second cooling body such that the second plurality of cooling fins is integrally formed as part of the second cooling body.

5. The assistance system of claim 1, wherein the first plurality of cooling fins extend in the first direction toward the second cooling body and the second plurality of cooling fins extend in the second direction toward the first cooling body.

6. The assistance system of claim 1, wherein the first cooling body is formed by a first housing half of the camera housing and wherein a printed circuit board is arranged within the camera housing, which lies on the first housing half.

7. The assistance system of claim 6, wherein the printed circuit board is affixed by clamping between the first housing half and the second housing half.

8. The assistance system of claim 7, wherein an optics module is inserted into a bush which is mounted on the printed circuit board.

9. The assistance system of claim 8, wherein the optics module and the first housing half are fixable mountable to a windshield of the vehicle.

10. The assistance system of claim 1, wherein each of the first plurality of cooling fins are spaced apart from each of the second plurality of cooling fins and the area between the first plurality of cooling fins and the second plurality of cooling fins is free of fluid.

11. A camera for use with a motor vehicle comprising:
    a camera housing having a first cooling body and a first plurality of cooling fins extending in a first direction from a first comb formed on the first cooling body such that the first plurality of cooling fins is integrally formed as part of the first cooling body;
    a cap covering the camera housing, wherein the cap forms a second cooling body and a second plurality of cooling fins extends in a second direction from a second comb formed on the second cooling body such that the second plurality of cooling fins is integrally formed as part of the second cooling body;
    wherein the second plurality cooling fins are arranged such that each of the second plurality of cooling fins are alternately at least partially between each of the first plurality of cooling fins; and
    wherein the first plurality of cooling fins extend in the first direction toward the second cooling body and the second plurality of cooling fins extend in the second direction toward the first cooling body.

12. The camera of claim 11, wherein the first and second heat transfer surfaces of the first plurality of cooling fins are facing the first and second heat transfer surfaces of the second plurality of cooling fins.

13. The camera of claim 12, wherein the first plurality of cooling fins are arranged parallel to the second plurality of cooling fins.

14. The camera of claim 11, wherein the first cooling body is formed by a first housing half of the camera housing and wherein a printed circuit board is arranged within the camera housing, which lies on the first housing half.

15. The camera of claim 14, wherein the printed circuit board is affixed by clamping between the first housing half and the second housing half.

16. The camera of claim 15, wherein an optics module is inserted into a bush which is mounted on the printed circuit board.

17. The camera of claim 16, wherein the optics module and the first housing half are fixable mountable to a windshield of the vehicle.

18. The camera of claim 17, wherein each of the first plurality of cooling fins are spaced apart from each of the second plurality of cooling fins and the area between the first plurality of cooling fins and the second plurality of cooling fins is free of fluid.

19. A camera for use with a motor vehicle comprising:
a camera housing having a first cooling body with a first plurality of cooling fins extending therefrom, wherein each of the first plurality of cooling fins have a first and a second heat transfer surface;
a cap covering the camera housing having a second cooling body with a second plurality of cooling fins extending therefrom, wherein each of the second plurality of cooling fins have a first and a second heat transfer surface; and
wherein the second plurality cooling fins are arranged such that each of the second plurality of cooling fins are alternately at least partially between each of the first plurality of cooling fins such that first and second heat transfer surfaces of the first plurality of cooling fins are facing the first and second heat transfer surfaces of the second plurality of cooling fins.

* * * * *